United States Patent
Hurley et al.

(10) Patent No.: US 8,653,171 B2
(45) Date of Patent: Feb. 18, 2014

(54) PLASTISOL COMPOSITIONS THAT ARE ESSENTIALLY FREE OF POLYVINYL HALIDES AND PHTHALATES

(75) Inventors: James Hurley, Atlanta, GA (US); James Kevin Seagraves, Canton, GA (US); Erik Saly, Woodstock, GA (US)

(73) Assignee: PolyOne Corporation, Avon Lake, OH (US)

( * ) Notice: Subject to any disclaimer, the term of this patent is extended or adjusted under 35 U.S.C. 154(b) by 51 days.

(21) Appl. No.: 13/029,049

(22) Filed: Feb. 16, 2011

(65) Prior Publication Data

US 2011/0206907 A1    Aug. 25, 2011

Related U.S. Application Data

(60) Provisional application No. 61/306,789, filed on Feb. 22, 2010.

(51) Int. Cl.
*C08L 83/00* (2006.01)
*C08K 5/00* (2006.01)

(52) U.S. Cl.
USPC .................. 524/285; 523/201; 428/195.1

(58) Field of Classification Search
USPC .................. 524/285; 523/201; 428/195.1
See application file for complete search history.

(56) References Cited

U.S. PATENT DOCUMENTS

| | | |
|---|---|---|
| 4,199,486 A | 4/1980 | Boessler et al. |
| 6,355,712 B1 | 3/2002 | Schultes et al. |
| 6,433,048 B2 | 8/2002 | Kasai |
| 6,495,626 B1 | 12/2002 | Overend et al. |
| 7,323,588 B2 | 1/2008 | Grass et al. |
| 7,413,813 B2 | 8/2008 | Gosse et al. |
| 2005/0261427 A1 * | 11/2005 | Saito ........................ 525/88 |
| 2006/0014868 A1 | 1/2006 | Mae et al. |
| 2006/0100312 A1 | 5/2006 | Hall et al. |
| 2006/0148929 A1 | 7/2006 | Nakayama et al. |
| 2006/0173110 A1 | 8/2006 | Baba |
| 2007/0251415 A1 | 11/2007 | Baba |
| 2009/0124737 A1 | 5/2009 | Holt et al. |
| 2009/0292066 A1 * | 11/2009 | Schattka et al. ........... 524/556 |
| 2010/0298477 A1 | 11/2010 | Godwin |
| 2010/0305250 A1 | 12/2010 | Colle et al. |
| 2010/0310891 A1 | 12/2010 | Godwin |

\* cited by examiner

*Primary Examiner* — Hannah Pak
(74) *Attorney, Agent, or Firm* — John H. Hornickel; Maria M. Hoke

(57) ABSTRACT

Plastisol compositions are disclosed containing methacrylate core/shell copolymer, non-phthalate ester plasticizers, pigment, filler, and thixotropic agent. Other additives are optional. The plasticizer is a blend of dibenzoate and DINCH. The plastisol can be used an ink of various colors for use in application to textiles. The plastisol compositions avoid polyvinyl chloride polymer resins and phthalate plasticizers conventionally employed in plastisol inks.

18 Claims, No Drawings

PLASTISOL COMPOSITIONS THAT ARE ESSENTIALLY FREE OF POLYVINYL HALIDES AND PHTHALATES

CLAIM OF PRIORITY

This application claims priority from U.S. Provisional Patent Application Ser. No. 61/306,789 filed on Feb. 22, 2010, which is incorporated by reference.

FIELD OF THE INVENTION

This application concerns plastisol compositions that are essentially free of vinyl halide and phthalate plasticizer materials.

BACKGROUND OF THE INVENTION

Plastisol compositions are well known for their ability to be screen-printed or otherwise applied to textiles and then be heated to form graphics and other images on the textiles. Most common among these imaged textiles are T-shirts with the image of famous entertainers, college names, witty sayings, etc.

The plastisol composition is often called a plastisol ink, because the means of application utilizes the fluid properties of the plastisol before heating and/or pressure causes the base resin in the plastisol to cure into a solid. Historically, most plastisols were a combination of polyvinyl chloride resin particles dispersed in and swelled by phthalate-based plasticizers.

Wilflex brand plastisol inks from PolyOne Corporation are world renown for their quality and variety of color products.

SUMMARY OF THE INVENTION

What the art needs is a plastisol ink that is essentially free of vinyl halide and phthalate plasticizer. Both consumers and marketers or printers of imaged textile products prefer compositions that do not include vinyl halide polymer resins or phthalate plasticizers for them.

"Essentially free" means that there is no intention to include any vinyl halide material nor phthalate plasticizer material in the plastisol compositions.

One aspect of the present invention are plastisol compositions that are essentially free of polyvinyl halides and phthalate plasticizers, comprising (a) methacrylate core/shell copolymer; (b) non-phthalate ester plasticizer; (c) pigment; (d) filler; and (e) thixotropic agent.

A feature of the present invention is that the plastisol compositions of the present invention have processing properties comparable to polyvinyl halide-based plastisol compositions without the presence of the polyvinyl halides.

An advantage of the present invention is that the plastisol compositions can be used as inks for placing, such as by screen-printing, graphics and other images on textiles in virtually the same manner as conventional polyvinyl halide-based plastisol inks.

Other aspects of the invention will become apparent from a description of the embodiments.

EMBODIMENTS OF THE INVENTION

Copolymer Base Resin

Resins for plastisols need to be compatible with the plasticizer used, and vice versa. Such resins need to have appropriate particle sizes for use in the mechanized application of inks to textiles. These two properties are common to conventional polyvinyl halides, which as dispersion resins are properly suited for being plasticized by phthalate materials.

Resins for the present invention need also to be essentially free of polyvinyl halides. The resins acceptable for use in the present invention include methacrylate copolymers as core/shell copolymers. Methacrylate core/shell copolymers are desirable because they can be dispersed in non-phthalate plasticizer to form essentially 100% solid compounds that are used in plastic coatings industry.

Desirably, the core of the copolymer is a copolymer of methyl methacrylate (MMA) monomer and butyl methacrylate (BMA) monomer, i.e., PMMA-PBMA copolymer. Desirably, the shell of the copolymer is homopolymer of MMA, i.e., PMMA.

The glass transition temperature ($T_g$) of the copolymer, as measured using DSC at a ramp rate of 10° C./min displays two peaks: one for the PMMA-rich shell occurring at a temperature between 110° C.-125° C., and a second peak for the PMMA-PBMA core occurring at a temperature between 85° C.-105° C. The volume ratio of the core-to-shell is in the range 1:3 to 3:1. The number average molecular weight, $M_n$, of the copolymer resin can range from 160,000 to 350,000, as measured using high performance size exclusion chromatography, relative to polystyrene, with a polydispersity $M_w/M_n$ between 3.0 and 6.0.

Methacrylate-based copolymers can take a variety of forms as delivered from the manufacturer: bead polymers, pellets, granules, powders, spray dried emulsion polymers, etc.

A preferred PMMA-PBMA/PMMA core/shore copolymer is Dianal® RB-2948 brand copolymer from Mitsubishi Rayon Co. Ltd.

Plasticizers

Plasticizers need to be compatible with the PMMA-PBMA/PMMA core/shell polymer base resin(s). In this invention, the plasticizers need to be essentially free of phthalate containing compounds.

A combination of a high solubility parameter and low solubility parameter is used. Dibenzoates ably serve as the high solubility parameter plasticizer. Di(isononyl) cyclohexane-1,2-dicarboxylate (DINCH) ably serves as the low solubility parameter plasticizer.

The relative ratio of the dibenzoate to the DINCH is chosen such that the gelation temperature of the plastisol (G'/G"cross-over) in a parallel plate rheometer under conditions of a dynamic temperature ramp (3° C./min) occurs at a temperature between 79° C. and 89° C. Plasticizers within this range have the optimum trade-off between viscosity storage stability, good "flash" cure characteristics and thermodynamic compatibility (lack of plasticizer exudation).

The dibenzoate plasticizer can be 2,2,4-trimethyl-1,3-pentanediyl dibenzoate (available commercially as Benzoflex 354 plasticizer) or dipropylene glycol dibenzoate (available commercially as Benzoflex 9-88 plasticizer) or a blend of both. Both Benzoflex plasticizers are marketed by Genovique Specialties of Rosemont, Ill., formerly known as Velsicol).

The DINCH plasticizer is commercially available from EXXAL branded DINCH from ExxonMobil and Hexamoll branded DINCH from BASF.

To a large degree, the ratio of dibenzoate to DINCH will depend on the composition of the core-shell copolymer resin. Resins with more PMMA will require more dibenzoate plasticizer. Resins with more PBMA will require more DINCH. Therefore, without undue experimentation, a person having ordinary skill in the art will be able to determine the correct ratio functionally as that ratio necessary to achieve a gelation temperature in the range of about 79° C.-89° C. using a 3° C./min temperature ramp rate in an oscillatory parallel-plate rheometer. Practically, the dibenzoate:DINCH ratio could range from 9:1 to 4:6. Preferably, that ratio is in the range of 9:1 to 7:3 for the preferred PMMA-PBMA/PMMA core/ shore copolymer identified above. Going outside these ranges (and these gel temperatures), for the preferred PMMA-PBMA/PMMA core/shore copolymer identified above, leads to plasticizer exudation or poor viscosity storage stability.

Pigment

Pigments are chosen for stability and color-fastness on the textile to be imaged. Pigments are particulate in form, which is a consideration on proper dispersion of such solids in the plastisol compositions of the present invention. Therefore, some care should be taken to provide adequate mixing of the ingredients of the plastisol composition.

Pigments are as varied as the colors of desired by the consumer. Pigments are well known to those of skill in the art, and are not different from pigments useful in the plastisol compositions containing polyvinyl halides and phthalates.

Of well known pigments, Table 1 shows representative examples of pigments which have been formulated with the plastisol compositions of the present invention.

TABLE 1

Commercial Pigments

| Pigment Brand Name | Source | Location |
| --- | --- | --- |
| VR11 AURORA PINK | Dayglo | Cleveland, OH |
| VR13 ROCKET RED PIGMENT | Dayglo | Cleveland, OH |
| ORANGE-RED FB-400 | United Mineral Co. | Korea |
| RED, FB-403 POWDER | United Mineral Co. | Korea |
| MP-PR5547 | Radiant | Richmond, CA |
| VR19 HORIZON BLUE | Dayglo | Cleveland, OH |
| RAD MP CH5510 | Radiant | Richmond, CA |
| TIONA R-CL4 | Millenium | Hunt Valley, MD |
| CAP 3422C ORANGE | Cappelle | Menen, Belgium |
| RAD LR1412 LITHOL RUBINE | Magruder | Elizabeth, NJ |
| HOSTAPERM PINK E | Clariant | Basel, Switzerland |
| HOSTAPERM VIOLET R | Clariant | Basel, Switzerland |
| ULTRAMARINE BLUE | Whittaker, Clark & Daniels | South Plainfield, NJ |
| HEUCO PHTHALOCYANATE | Heucotech | Fairless Hills, PA |
| 264-8142 SUNFAST GREEN | Sun | Cinncinnati, OH |
| PERMANENT YELLOW | Clariant | Basel, Switzerland |
| CABOT REGAL 400R | McCullough & Benton | Charlotte, NC |
| HOSTAPERM PINK E | Clariant | Basel, Switzerland |
| UHLICH YE-1400 YELLOW | Uhlich/Magruder | Elizabeth, NJ |
| TIOXIDE R-FC6 | Huntsman | Billingham, England |

The pigment of particular concern is titanium dioxide ($TiO_2$) because white plastisols used as textile printing inks comprise approximately 50% of all plastisol ink used. Also white pigment must fulfill a number of additional technical requirements, e.g. good printing characteristics, opacity when printed on dark garments, the ability to "flash" (=fuse quickly under heat lamps), etc.

The $TiO_2$ pigment should be of the rutile phase, with a mean particle size between 0.2 and 0.4 µm.

Filler

To adjust viscosity, the ink should also contain filler, such as precipitated calcium carbonate ($CaCO_3$). Desirably, the calcium carbonate should have a nearly spherical particle morphology with a median particle size of around 70 nm.

Thixotropic Agent

The ink needs to include a thixotropic agent, in order that the shear stress vs. shear rate curve of the plastisol used as an ink, measured using an oscillatory frequency sweep at 25° C. with a cone and plate rheometer then data-transformed using the Cox-Merz Rule, conforms approximately to power-law fluid $\tau = K(\tau)^n$ where $\tau$ is the shear stress, K is the consistency of about $1.3 \times 10^5$ Pa.s, $\gamma$ is the shear rate and n (exponential factor) of about 0.134. In addition, it is important that the plastisol ink display a creep strain <0.05 when subjected to a static stress of 50 Pa in a creep test, using a cone and plate rheometer. When conforming to these requirements, the plastisol ink possesses a thick, buttery and "short" texture which allows for good printability, while at the same time producing printed images possessing good opacity and a soft, smooth "hand".

If no thixotropic agent is present in plastisol inks of the present invention, then the printed garment will have a rough "hand." The rough "hand" is caused by the unevenness of the surface deposit, primarily determined by surface roughness and coefficient of friction.

The thixotropic agent can be either a fumed silica such as Aerosil® 200 particles commercially available from Evonik Degussa or hydrogenated castor oil such as Thixcin® R oil commercially available from Elementis Specialties, or combinations thereof.

Optional Additives

A variety of additives known to those skilled in the art can be included in plastisol compositions of the present invention to increase processing or performance properties.

Non-limiting examples of additives include dispersants, lubricants, optical brighteners, puff matting agents, antioxidants, chemical and physical blowing agents, stabilizers, moisture scavengers, air release agents, oxidizers, reducers, and combinations thereof, etc.

These additives are commercially available from a wide variety of sources and are very well known by those skilled in the art desiring formulations that mix and process well (dispersants, lubricants, air release agents, etc.) as well as provide valuable performance properties (optical brighteners, puff matting agents, antioxidants, etc.)

Range of Ingredients

Table 2 shows acceptable, desirable, and preferred ranges of the ingredients identified above: core/shell copolymer resin, plasticizers, pigment, filler, thixotropic agent, and optional additives.

TABLE 2

Range of Ingredients

| Ingredient (Wt. %) | Acceptable Range | Desirable Range | Preferable Range |
| --- | --- | --- | --- |
| Core/shell PMMA-PBMA/PMMA Copolymer | 10-35 | 15-30 | 20-25 |
| Plasticizer Blend of Dibenzoate and DINCH | 20-45 | 25-40 | 30-35 |
| Pigment(s) | 10-40 | 15-35 | 20-30 |
| $CaCO_3$ Filler | 5-20 | 8-17 | 10-15 |
| Thixotropic Agent | 1-25 | 1-20 | 1-15 |
| Additives | 0-40 | 5-30 | 10-20 |

The variation of pigment concentration depends greatly on how much pigment is needed to achieve the desired color.

Some intense fluorescent colors require multiple pigments in significant concentrations. Also, pigment concentration is dependent on the location of color within colorspace, especially with respect to lightness/darkness.

The variation in additive concentration depends are which additives are being added and for what purpose. Those skilled in the art would not require undue experimentation to develop a collection of preferred additives and their concentrations to achieve flowable plastisol inks with lasting appearance on the textile.

The amount of ingredients identified in Table 2 does not necessarily indicate the order of addition of such ingredients. Because of the necessity of mixing intimately particulates (resin(s), pigment(s), certain additives) into the plasticizer, it is preferable to apportion the amount of plasticizer for introduction into a mixing chamber at various times. More preferably, for economy of color generation as known to those skilled in the art, one can develop a masterbatch of basis ingredients and then have a separate pigment concentrate(s) that are compatible with the masterbatch but do not require the inventory of having a full complement of colors of plastisol compositions, so long as the masterbatch can be mixed with a selected pigment concentrate at the appropriate time.

In respect of processing of plastisol compositions of the present invention, a feature of the invention is that the ingredients selected for the compositions unexpectedly provide very similar processing conditions for use by one skilled in the art of using polyvinyl halide plastisol compositions. Thus, it is very advantageous via the present invention to have an entirely new line of possible plastisol inks with virtually the same mechanics and techniques of use to make imaged graphics on textiles.

Method of preparing masterbatches and pigment concentrates are well known to those skilled in the art. The method of preparation of plastisol inks of this invention is identical to that of plastisol inks made from vinyl halides and phthalate esters. However, it has been found that use of three-roll milling aids in reducing particle size of the inks to improve delivery of the inks in the screen-printing process to the textile to be imaged.

Preferably, one can blend the core/shell copolymer resin, plasticizers, fillers, pigments, and optional processing/performance aids together using a rotary mixer with jacketed cooling tub until the resulting mixture is homogeneous. Then, in a second step, the mixture is de-agglomerated using a 3-roll mill, for a sufficient duration to ensure a Hegman fineness of grind value >6. Then, in a third step, the thixotropic agent is added so as to achieve the final viscosity target.

USEFULNESS OF THE INVENTION

Plastisol inks of the present invention provide comparable processing and performance as conventional plastisol inks containing polyvinyl halide resins and phthalate plasticizers, but are essentially free of them. For example, one can use the same squeegees, ovens, cure temperatures, dwell times, screens, emulsions, and clean up techniques as employed for polyvinyl chloride/phthalate plastisol inks.

The viscosity of plastisol inks is acceptably from about 30,000 to about 200,000 centipoise, desirably from about 40,000 to about 180,000 cps and preferably from about 120,000 to about 160,000 cps when measured at 20 revolutions per minute. The inks are printable via screen printing techniques, including without limitation high speed automatic presses, manual printing, and high speed rotary printers.

Multiple plastisol inks can be used with different pigments in order to generate multi-colored image graphics according to techniques well known in the art.

It is an advantage of the invention that one can continue to use known techniques with new plastisol ink formulations that process and perform in a like manner to conventional plastisol ink formulations. Thus, mixers and printers are not required to learn new techniques, yet the screen-printed image graphics are made from new plastisol ink formulations.

The invention is not limited to the above embodiments. The claims follow.

What is claimed is:

1. A plastisol composition that is essentially free of polyvinyl halides and phthalate plasticizers, comprising:
   (a) methacrylate core/shell copolymer;
   (b) non-phthalate ester plasticizer comprising a blend of dibenzoate and di(isononyl)cyclohexane-1,2-dicarboxylate;
   (c) pigment;
   (d) filler; and
   (e) thixotropic agent;
   wherein the dibenzoate ester is selected from the group consisting of 2,2,4-trimethyl-1,3-pentanediyl dibenzoate, dipropylene glycol dibenzoate, and a blend of both, and wherein relative ratio of the dibenzoate to the di(isononyl)cyclohexane-1,2-dicarboxylate is determined by gelation temperature of the plastisol (G'/G''cross-over) in a parallel plate rheometer under conditions of a dynamic temperature ramp (3° C./min) occurring at a temperature between 79° C. and 89° C.

2. The plastisol composition according to claim 1, wherein copolymer is PMMA-PBMA/PMMA core/shell copolymer.

3. The plastisol composition according to claim 2, wherein the copolymer has a glass transition temperature of between 110° C. and 125° C. for the shell and a glass transition temperature of between 85° C. and 105° C. for the core.

4. The plastisol composition according to claim 3, wherein a volume ratio of core to shell is in the range of 1:3 to 3:1.

5. The plastisol composition according to claim 4, wherein the copolymer has a number average molecular weight ranges from 160,000 to 350,000.

6. The plastisol composition according to claim 5, wherein a ratio of dibenzoate to di(isononyl)cyclohexane-1,2-dicarboxylate ranges from 9:1 to 4:6.

7. The plastisol composition according to claim 5, wherein the pigment is titanium dioxide and wherein the thixotropic agent is selected from the group consisting of fumed silica, hydrogenated castor oil, and combinations thereof.

8. The plastisol composition of claim 7, further comprising additives selected from the group consisting of dispersants, fillers, lubricants, optical brighteners, puff matting agents, antioxidants, chemical and physical blowing agents, stabilizers, moisture scavengers, air release agents, oxidizers, reducers, and combinations thereof.

9. The plastisol composition of claim 8, wherein the plastisol composition in weight percent comprises:

| | |
|---|---|
| Core/shell PMMA-PBMA/PMMA Copolymer | 10-35 |
| Plasticizer Blend of Dibenzoate and DINCH | 20-45 |
| Pigment(s) | 10-40 |
| Filler | 5-20 |

| | |
|---|---|
| Thixotropic Agent | 1-25 |
| Additives | 0-40. |

10. A method of making the plastisol composition of claim 1, comprising the steps of:
(a) blending, into a mixture, methacrylate core/shell copolymer, non-phthalate ester plasticizer comprising a blend of dibenzoate and di(isononyl)cyclohexane-1,2-dicarboxylate, filler, and pigment, together using a rotary mixer with jacketed cooling tub until the mixture is homogeneous;
(b) de-agglomerating the mixture using a 3-roll mill, for a sufficient duration to ensure a Hegman fineness of grind value >6; and
(c) adding thixotropic agent,
wherein the dibenzoate ester is selected from the group consisting of 2,2,4-trimethyl-1,3-pentanediyl dibenzoate, dipropylene glycol dibenzoate, and a blend of both, and wherein relative ratio of the dibenzoate to the di(isononyl)cyclohexane-1,2-dicarboxylate is determined by gelation temperature of the plastisol composition (G'/G" cross-over) in a parallel plate rheometer under conditions of a dynamic temperature ramp (3° C./min) occurring at a temperature between 79° C. and 89° C.

11. A textile article having an image graphic printed thereon from the plastisol composition of claim 1.

12. The plastisol composition of claim 1, in the form of an image graphic printed on a textile article.

13. The plastisol composition according to claim 12, wherein the image graphic of plastisol is applied by a screen-printing technique on the textile article.

14. The plastisol composition according to claim 12, wherein the copolymer is PMMA-PBMA/PMMA core/shell copolymer.

15. The plastisol composition according to claim 12, wherein a ratio of dibenzoate to di(isononyl)cyclohexane-1,2-dicarboxylate in the non-phthalate ester plasticizer ranges from 9:1 to 4:6.

16. The plastisol composition according to claim 1, wherein the copolymer has a glass transition temperature of between 110° C. and 125° C. for the shell and a glass transition temperature of between 85° C. and 105° C. for the core.

17. The plastisol composition according to claim 16, wherein a volume ratio of core to shell is in the range of 1:3 to 3:1.

18. The plastisol composition according to claim 17, wherein the copolymer has a number average molecular weight ranges from 160,000 to 350,000.

* * * * *